(12) United States Patent
Palmese et al.

(10) Patent No.: US 9,394,427 B2
(45) Date of Patent: Jul. 19, 2016

(54) TOUGHENING CROSS-LINKED THERMOSETS

(71) Applicants: Drexel University, Philadelphia, PA (US); Government of the United States as represented by the Secretary of the Army, Washington, DC (US)

(72) Inventors: Giuseppe R. Palmese, Hainesport, NJ (US); John J. LaScala, Bear, DE (US); James M. Sands, Kingsville, MD (US); Xing Geng, Fort Wayne, IN (US)

(73) Assignees: The United States of America as represented by the Secretary of the Army, Washington, DC (US); Drexel University, Philadelphia, PA (US)

( * ) Notice: Subject to any disclaimer, the term of this patent is extended or adjusted under 35 U.S.C. 154(b) by 0 days.

(21) Appl. No.: 14/791,057

(22) Filed: Jul. 2, 2015

(65) Prior Publication Data
US 2015/0361247 A1 Dec. 17, 2015

Related U.S. Application Data

(62) Division of application No. 14/320,698, filed on Jul. 1, 2014, now Pat. No. 9,102,807, which is a division of application No. 13/990,360, filed as application No. PCT/US2011/059549 on Nov. 7, 2011, now Pat. No. 8,785,547.

(60) Provisional application No. 61/417,911, filed on Nov. 30, 2010.

(51) Int. Cl.
| | |
|---|---|
| *C08K 5/15* | (2006.01) |
| *C08K 5/101* | (2006.01) |
| *C08L 67/06* | (2006.01) |
| *C11C 3/04* | (2006.01) |
| *C11C 3/08* | (2006.01) |
| *C08F 120/40* | (2006.01) |
| *C08K 5/1515* | (2006.01) |
| *C08L 31/02* | (2006.01) |
| *C08F 222/40* | (2006.01) |
| *C08K 3/00* | (2006.01) |
| *C08F 8/44* | (2006.01) |
| *C08F 269/00* | (2006.01) |

(52) U.S. Cl.
CPC ............ *C08K 5/1515* (2013.01); *C08F 120/40* (2013.01); *C08F 222/40* (2013.01); *C08K 3/0033* (2013.01); *C08K 5/101* (2013.01); *C08L 31/02* (2013.01); *C08L 67/06* (2013.01); *C11C 3/04* (2013.01); *C11C 3/08* (2013.01); *C08F 8/44* (2013.01); *C08F 269/00* (2013.01)

(58) Field of Classification Search
CPC .... C08K 5/1515; C08K 5/101; C08K 3/0033; C08L 67/06; C08L 31/02; C11C 3/04; C11C 3/08; C08F 120/40; C08F 222/40; C08F 8/44; C08F 269/00

USPC ............................ 524/548; 549/539; 525/286
See application file for complete search history.

(56) References Cited

U.S. PATENT DOCUMENTS

| | | | |
|---|---|---|---|
| 6,037,392 A | 3/2000 | Tang et al. | |
| 6,121,398 A | 9/2000 | Wool et al. | |
| 6,825,242 B2 | 11/2004 | Sulzbach et al. | |
| 8,785,547 B2 | 7/2014 | Palmese et al. | |
| 9,102,807 B2 | 8/2015 | Palmese et al. | |
| 2003/0139489 A1 | 7/2003 | Sulzbach et al. | |
| 2007/0072106 A1* | 3/2007 | Hong ................... | G03G 9/0806 430/109.31 |
| 2009/0275715 A1 | 11/2009 | Boyles et al. | |

FOREIGN PATENT DOCUMENTS

| | | | | |
|---|---|---|---|---|
| IL | WO 2009069116 A2 * | 6/2009 | ............. | C12P 7/649 |
| JP | 06-145691 A | 5/1994 | | |
| JP | 06145691 A * | 5/1994 | | |
| WO | WO2005097893 A1 | 10/2005 | | |
| WO | WO 2005097893 A1 * | 10/2005 | ............. | C08L 53/00 |
| WO | WO2009069116 A2 | 6/2009 | | |

OTHER PUBLICATIONS

Pham, S., et al., "Toughening Of Vinyl Ester Resins with Modified Polybutadienes," Polymer, 1995, vol. 36, No. 17, pp. 3279-3285.
Thielemans, W., et al., "Novel Applications Of Lignin In Composite Materials," Journal of Applied Polymer Science, 2002, vol. 83, pp. 323-331.
Lu, J., et al., "New Sheet Molding Compound Resins From Soybean Oil I. Systhesis And Characterization," Polymer, vol. 46, 2005, pp. 71-80.
Lathi, P. S., et al., "Green Approach for the Preparation of Biodegradable Lubricant Base Stock from Epoxidized Vegetable Oil," Applied Catalysis B: Envronmental, vol. 69, 2007, pp. 207-212.

(Continued)

*Primary Examiner* — Michael M Bernshteyn
(74) *Attorney, Agent, or Firm* — Mendelsohn Dunleavy, P.C.

(57) ABSTRACT

Grafted triglycerides comprising an acrylated triglyceride grafted with a fatty acid residue containing 4 to 28 carbon atoms. Also described are methods for making a grafted triglyceride and for curing a material selected from vinyl esters and unsaturated polyesters and mixtures thereof and optionally a reactive diluent. The method includes the steps of mixing a grafted triglyceride of the present invention with a material selected from vinyl esters, unsaturated polyesters and mixtures thereof to form a mixture, and curing the mixture to form a cured resin system. A cured resin system comprising a cured product obtained by the foregoing method and composites containing the cured product and a filler or reinforcing material are also disclosed. This method also includes use of the grafted triglycerides to make toughened resin and composite systems with reduced hazardous air pollutants without significantly reducing the glass transition temperature and significantly increasing the viscosity.

20 Claims, 6 Drawing Sheets

(56) References Cited

OTHER PUBLICATIONS

Demertzis, P.G., et al., "Gas Chromatographic Studies on Polymer-Plasticizer Compatibility: Interactions Between Food-Grade PVC and Epoxidized Soybean Oil," Eur. Polym. J., 1991, vol. 27, No. 3, pp. 231-235.

Liu, P., et al., "Hydroxylbenzylthioethers As Novel Organic Thermal Stabilizers for Rigid PVC," Polymer Degradation and Stability, 2007, vol. 92, pp. 503-508.

Park, S.J., et al., "Thermal and Mechanical Properties of Tetrafunctional Epoxy Resin Toughened with Epoxidized Soybean Oil," Material Science and Engineering A, 2004, vol. 374, pp. 109-114.

Ratna, D., et al., "Epoxidized Soybean Oil Toughened Epoxy Adhesive," Journal of Adhesion Science And Technology, 2000, vol. 14, No. 1, pp. 15-25.

Miyagawa, H., et al., "Fracture Toughness and Impact Strength of Anhydride-Cured Biobased Epoxy," Polymer Engineering and Science, 2005, vol. 45, No. 4, pp. 487-495.

\* cited by examiner

(-■- = Derakane™ 411-350, -□- = toughened Derakane™ 411-350)

Figure 6

(-■- = Derakane™ 411-350, -□- = toughened Derakane™ 411-350)

Figure 7

(-■- = Derakane™ 411-350, -□- = toughened Derakane™ 411-350)

Figure 8

(-■- = Derakane™ 411-350, -□- = toughened Derakane™ 411-350)

Figure 9

TOUGHENING CROSS-LINKED THERMOSETS

RELATED APPLICATION DATA

This application is a divisional of U.S. patent application Ser. No. 14/320,698, filed Jul. 1, 2014, which is a divisional of U.S. patent application Ser. No. 13/990,360, filed May 29, 2013, now U.S. Pat. No. 8,785,547, issued Jul. 22, 2014, which claims priority to International Application No. PCT/US11/059549, filed Nov. 7, 2011, which claims priority to U.S. Provisional Application No. 61/417,911, filed Nov. 30, 2010, the entire disclosure of which is hereby incorporated by reference as if set forth fully herein.

STATEMENT OF GOVERNMENTAL INTEREST

This invention was made with government support under Grant No. W911NF-06-2-0013 awarded by the U.S. Army. The Government has certain rights in this invention.

BACKGROUND OF THE INVENTION

1. Field of Invention

The present invention is directed to thermoset polymer toughening agents and to vinyl ester and unsaturated polyester resins toughened using these toughening agents.

2. Brief Description of the Prior Art

Vinyl ester (VE) resins are one of the most popular resin systems used in polymer matrix composite fabrication for military and commercial applications due to their good properties, low weight and low cost. VE resins typically contain two components, dimethacrylate esters and a reactive diluent. The dimethacrylate esters are commonly made by, for example, reacting methacrylic acid with bisphenol A-based epoxy resin. A typical reactive diluent is styrene, in an amount of 40-60 wt % to provide processing ease and chemical reactivity. These VE resin systems normally possess low viscosity (<500 cP) at room temperature and can be readily processed using low cost tooling such as vacuum assisted resin transfer molding (VARTM).

VE resins have superior properties relative to unsaturated polyester (UPE) systems and are less expensive and easier to process than epoxy systems. However, like other thermoset resins, unmodified vinyl esters suffer from brittleness and low resistance to fracture that limits their application as structural materials. As a result, significant effort has been expended on toughening VE resins. Common toughening methods include: 1) increasing the molecular weight of the VE resins, 2) incorporating a chain extender into the VE resin network, and 3) introducing additives to the VE resin system as toughening agents. Typical toughening agents may include rigid thermoplastics or rubber particles. Among these three options, the use of a toughening agent to form a second dispersed phase in the VE resin provides a desired means of improving fracture toughness since this option provides both the desired toughening effect and an acceptable level of change in the glass transition temperature (Tg) of the resin.

The most frequently used toughening modifiers for VE resins are liquid rubbers that are based on butadiene-acrylonitrile copolymers terminated with various functionalities like vinyl, epoxy and carboxyl. Auad M. L., et al., Polymer 2001, 42:3723-3730; Robinette E. J. and Palmese G. R., Polymer 2004, 43:6143-6154; Dreerman E., et al., Journal of Applied Polymer Science, 1999, 72:647-657; Ullett J. S., Polymer Engineering and Science, 1995, 35:1086-1097; Auad M. L., et al., Journal of Applied Polymer Science, 2003, 89:274-283 and Auad M. L., et al., Journal of Materials Science, 2002, 37:4117-4126. These liquid rubbers are low-molecular-weight elastomer prepolymers and can mix with VE resins to form a stable, homogeneous system at room temperature in the presence of significant amounts of styrene or under mechanical agitation due to their relative immiscibility with VE resins. It is difficult to form a miscible system with epoxy derived VE resins using liquid rubbers with molecular weights ranging from 3000 g/mol to 4000 g/mol unless more polar groups are contained in the liquid rubber, as is the case for high acrylonitrile content (26%) carboxyl terminated butadiene-acrylonitrile copolymers (CTBN). Auad M. L., et al., Polymer 2001, 42:3723-3730. This approach is, nevertheless, insufficient for the high molecular weight VE resins with low solubility parameters, especially the recently developed novolac VE resins with multi-functionality and low VOC VE resins with styrene partially replaced by environmental friendly diluents like methacrylated fatty acid (MFA). La Scala J. J. et al., Polymer 2005, 46:2908-2921 and Geng, X., et al., Composites Research Journal 2009; 2:36-42.

Grafting liquid rubber directly to the VE resin backbone is an effective method to improve the compatibility of toughening modifiers with VE resin. For example, Derakane™ 8084 is a toughened version of Derakane™ 411-45 in which about 7% of a low-molecular-weight CTBN is chemically bonded through terminal ester groups with 2,2'-bis(4-hydrophenyl) propane units during manufacture. Pham S., Polymer 1995, 36:3279-3285. This toughened VE resin system exhibits moderate fracture toughness but also includes a large amount of styrene, namely, 40% by weight.

Triglycerides are found in oils, such as soybean oil, linseed oil, etc. Soybean oil, as an example, is a renewable resource which contains different kinds of unsaturated fatty acids and saturated fatty acids with varying carbon chain lengths. Three unsaturated fatty acids with varying functionalities are connected by a glycerol center. The average unsaturation degree is 4.6. Epoxidized soybean oil (ESO) is a type of functionalized triglyceride. ESO has been used as a composite (Thielemans W., et al., Journal of Applied Polymer Science, 2002, 83:323-331 and Lu J., et al., Polymer, 2005, 46:71-80), a lubricant, a plasticizer, and a thermal stabilizer (Lathi P. S., Applied Catalysis B: Environmental, 2007, 69:207-212, Demertzis P. G., et al., European Polymer Journal, 1991, 27(3):231-235 and Liu P., et al., Polymer Degradation and Stability, 2007, 92:503-508). Using ESO to toughen epoxy resins is also known (Park S. J., et al., Materials Science and Engineering A, 2004, 374:109-114, Ratna D., Journal of Adhesion Science and Technology, 2000, 14(1):15-25 and Miyagawa H., et al., Polymer Engineering and Science, 2005, 45(4):487-495.

U.S. Pat. No. 6,121,398 (Wool et al.) discloses high modulus polymers and composites that are derived from plant oils. This patent includes an extensive discussion of the various types and uses of triglycerides obtained from natural sources such as plant oils. This patent discloses functionalized triglycerides that are polymerizable and their use to produce high modulus polymers. The functionalized triglycerides may be produced via a number of different chemical synthesis routes. For example, epoxidized triglyerides may be produced and converted to resilient rubbers by control of the molecular weight and cross-link density. The resultant rubbers can be used as rubber toughening agents in rigid composites. In the examples of this patent, acrylated base resins are prepared by reacting the epoxidized triglycerides with acrylic materials such as acrylic acid. In Example 34 of this patent, 8 grams of acrylated epoxidized triglyceride was mixed with a range of 2-8 grams of Dow Derakane™ 411 vinyl ester resin and 0.2 grams of USP 245 free radical initiator, purged with nitrogen and heated for one hour at 90° C. and an additional hour at 110° C. to provide a rigid thermoset resin. The thermoset resins prepared by this method are said to have properties similar to commercial bisphenol-A vinyl ester resins, i.e. a tensile modulus of about 3 GPa, an elongation at break of 10%, a flexural modulus of about 2.8 GPa and a heat deflection temperature of 75° C. Other functionalized triglycerides are described in U.S. Pat. No. 6,825,242 and U.S. patent application publication nos: US 2003/0139489 and US 2009/0275715.

Vinyl ester and unsaturated polyester resins contain styrene, a hazardous air pollutant and carcinogen. The styrene in these resins is regulated under the EPA Reinforced Composites NESHAP. Most commercial solutions simply reduce the styrene content in the resin (~33 wt % styrene) making the resin barely acceptable for composite manufacture applications. In addition, reducing the styrene content significantly reduces the toughness of these resins. Recent solutions, such as methacrylated fatty acids show promise in reducing the styrene content, but result in a significant drop in glass transition temperature for the resin.

Accordingly, a need exists for new types of vinyl ester toughening agents to meet current requirements for toughening vinyl ester resin systems.

SUMMARY OF THE INVENTION

In a first aspect, the present invention relates to a grafted triglyceride comprising an acrylated triglyceride grafted with at least one fatty acid residue, wherein the fatty acid residue contains from 4 to 28 carbon atoms.

In a second aspect, the present invention relates to a method for curing a material selected from the group consisting of vinyl esters and unsaturated polyesters and mixtures thereof and optionally a reactive diluent. The method includes the steps of mixing a grafted triglyceride in accordance with the present invention with a material selected from vinyl esters, unsaturated polyesters and mixtures thereof to form a mixture, and curing the mixture to form a cured resin system.

In a third aspect, the present invention relates to a cured resin system comprising a cured product obtained by curing a material selected from the group consisting of vinyl esters and unsaturated polyesters and mixtures thereof, and optionally a reactive diluent and a grafted triglyceride in accordance with the present invention.

In a fourth aspect, the present invention relates to a composite material comprising the cured resin system of the present invention and a filler or reinforcing material.

In a fifth aspect, the present invention relates to a method for making a grafted triglyceride including the steps of acrylating an epoxidized triglyceride to form an acrylated triglyceride and grafting at least one fatty acid residue onto the acrylated triglyceride to form a grafted triglyceride.

In a sixth aspect, the grafted triglycerides can be used as an additive to a vinyl ester or unsaturated polyester to toughen these resins.

In a seventh aspect, the grafted triglycerides can be used as an additive to a vinyl ester or unsaturated polyester to reduce hazardous air pollutant content while toughening the resin.

These and other aspects of the invention will be apparent to a skilled person from the detailed description of various embodiments of the invention which follows.

DETAILED DESCRIPTION OF THE PREFERRED EMBODIMENTS

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other apparatuses and methods. Before explaining the disclosed embodiments of the present invention in detail, it is to be understood that the invention is not limited in its application to the details of any particular embodiment shown. The terminology used herein is for the purpose of description and not of limitation. Further, although certain methods are described with reference to certain steps that are presented herein in certain order, in many instances, these steps may be performed in any order as may be appreciated by one skilled in the art, and the methods are not limited to the particular arrangement of steps disclosed herein.

It must be noted that as used herein and in the appended claims, the singular forms "a", "an", and "the" include plural references unless the context clearly dictates otherwise. As well, the terms "a" (or "an"), "one or more" and "at least one" can be used interchangeably herein. It is also to be noted that the terms "comprising", "including", and "having" can be used interchangeably.

The present invention relates to a polymer composition and to a process for preparing a toughened polymer composition. The polymer composition contain one or more unsaturated polyester resins, one or more vinyl ester resins or mixtures of one or more unsaturated polyester resins and one or more vinyl ester resins. Vinyl ester resins, or epoxy acrylate-based resins, as they are also known, are employed in a variety of industrial applications.

Examples of suitable unsaturated polyester resins and vinyl ester resins which may be employed as base resin systems in the present invention include at least the following:

(1) Ortho-resins based on phthalic anhydride, maleic anhydride or fumaric acid and glycols such as 1,2-propylene glycol, ethylene glycol, diethylene glycol, triethylene glycol, 1,3-propylene glycol, dipropylene glycol, tripropylene glycol, neopentyl glycol or hydrogenated bisphenol-A.

(2) Iso-resins prepared from isophthalic acid, maleic anhydride or fumaric acid and glycols such as those listed above.

(3) Bisphenol-A fumarates based on ethoxylated bisphenol-A and fumaric acid.

(4) Chorendics prepared from chlorine/bromine containing anhydrides or phenols to make unsaturated polyester resins.

(5) vinyl ester resins produced by reaction of epoxy resins with (meth)acrylic acid or (meth)acrylamide.

Epoxy compounds which may be used to make vinyl ester resins include any commercially available epoxy resins. Epoxy resins are characterized by containing a 3-membered ring known as an epoxy, epoxide, oxirane or ethoxylene group. Epoxy resins typically contain aliphatic, cycloaliphatic or aromatic backbones. Suitable epoxy resins include, but are not limited to, diglycidyl ether of bisphenol-A, epoxies of the phenol-novolac type and epoxies based on tetrabromobisphenol-A.

Vinyl ester resins useful in the present invention include vinyl ester resins formulated for high temperature applications, such as cresol novolac based vinyl ester resins. Internally modified vinyl ester resins are also suitable for use in the present invention. Also, modified vinyl ester resins may be suitable for use in the present invention including vinyl esters made by replacing some of the (meth)acrylic acid in the vinyl ester resin synthesis with reactive liquid polymer. Preferably, the vinyl ester resins used in the present invention is a resin that is obtained by the esterification of an epoxy resin with a (meth)acrylic acid or (meth)acrylamide.

All of the resins mentioned above may be modified by methods known to skilled persons and still be used in the present invention. Suitable modifications include, but are not limited to, modifications to lower the acid, hydroxyl and/or anhydride number, or to increase flexibility, toughness, or increase the cross-link density of the resin, or to decrease flammability. Most preferably, the resins used in the present invention are vinyl ester resins.

The toughening agents of the present invention are derived from plant and animal oil triglycerides by suitably functionalizing the triglycerides with reactive groups that render them polymerizable. In addition, the triglycerides of the present invention are also modified to adjust the molecular weight of the functionalized triglycerides.

Triglycerides are a combination of triesters of fatty acids linked together by a glycerol. The fatty acid residues are derived from linear carboxylic acids containing from about 4 to about 30 carbon atoms, preferably, from about 14 to about 22 carbon atoms. The fatty acid residues may additionally contain unsaturation in the form of carbon-carbon double bonds, typically from about 0 to 4 carbon-carbon double bonds per residue.

The fatty acids derived from triglycerides include, but are not limited to, lauric acid, myristic acid, stearic acid, oleic acid, linoleic acid, linolenic acid, arachidic acid, gadoleic acid, behenic acid and erucic acid. Thus, triglycerides in accordance with the invention may contain one or more residues of each of the foregoing fatty acids, other fatty acids or mixtures thereof. Typical plant oil triglycerides used in the present invention contain about 10-20% saturated, about 20-30% mono-unsaturated, about 40-60% di-unsaturated and about 5-15% tri-unsaturated fatty acid residues, but other distributions of fatty acid residues can be employed within the scope of the invention.

The triglycerides of the present invention may be obtained from, for example, lard, rapeseed oil, palm oil, beef tallow, fish oil, soy bean oil, canola oil, sunflower oil, safflower oil, rice bran, corn oil, peanut oil, cottonseed oil, castor oil, linseed oil and colza oil. These triglycerides include a number of reactive sites for functionalization such as the double bond in triglycerides containing unsaturated groups, allylic carbons, the ester group and the carbons in the alpha position relative to the ester group. The present invention introduces functionality to the triglycerides at one or more of these reactive sites in order to introduce polymerizable groups onto the triglycerides and modify the molecular weight of the triglycerides.

Triglycerides may be converted to epoxidized triglycerides in any conventional manner such as by reaction with hydrogen peroxide. The resultant epoxy groups on the triglycerides can be employed as reactive sites for further modification of the epoxidized triglycerides. The number of double bonds in the triglycerides which are converted to epoxy groups may be controlled during the epoxidation reaction in a suitable, conventional manner, if it is desired to retain some of the double bonds in the triglyceride or control the degree of epoxidation. The degree of epoxidation of the triglyceride may also be influenced by selection of the starting triglyceride based on the number of unsaturated groups contained therein.

In the present invention, the epoxidized triglyceride is both acrylated to form an acrylated triglyceride and grafted with fatty acid groups to form a grafted triglyceride. Both of these reactions involve the epoxy groups on the epoxidized triglyceride and thus are competing reactions. The reactions may be carried out sequentially, in any order, or simultaneously to produce the desired product. However, it has been found that carrying out the reactions sequentially, by first acrylating and then grafting with fatty acid provides the greatest degree of control over the reaction and thus may allow a greater degree of customization and/or ensure that a larger amount of the desired grafted triglycerides are obtained.

The epoxidized triglycerides are preferably first acrylated with (meth)acrylic acid, acrylic acid, or (meth)acrylamide to provide suitable polymerizable groups in the acrylated triglycerides. Acrylation of the epoxidized triglycerides typically produces acrylated triglycerides having vinyl functionality, but the reaction conditions and proportions of the reactants used in the acrylation step are controlled to ensure that the acrylated triglycerides will contain some residual epoxy groups which may be used for the subsequent step of grafting the acrylated triglycerides with fatty acid groups.

Figure 1:
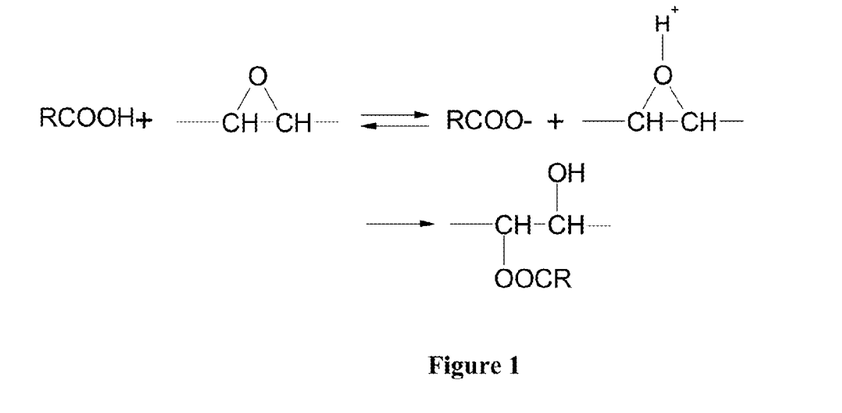
FIG. 1 shows the scheme of the reaction of a (fatty) carboxylic acid with epoxidized soybean oil.

The acrylated triglycerides may then be reacted with one or more fatty acids in order to graft the fatty acids onto the acrylated triglycerides at the epoxy group reactive sites. The reaction of an epoxy group on the acrylated triglycerides with a fatty carboxylic acid to provide a grafted triglyceride is shown in FIG. 1. Grafting of the fatty acids onto the acrylated triglyceride may be carried out under controlled conditions and/or using suitable amounts of reactants to react from 10-100% of the residual reactive epoxy groups on the acrylated triglyceride with fatty acid, more preferably 30 to 80% of the epoxy groups are reacted, and most preferably, 47 to 72% of the epoxy groups are reacted. In this manner, it is possible to retain some residual epoxy groups on the grafted triglyceride for further customization of the grafted triglyceride. Residual epoxy groups can, for example, be used to link the grafted triglycerides into a polymer network or to chain extend the grafted triglycerides using conventional chain extension reactions known to persons skilled in the art.

Alternatively, hydroxylated triglycerides or hydroxylated and epoxidized triglycerides could be used to prepare the desired composition of matter. Hydroxylated triglycerides include naturally occurring oils, such as castor oil, and synthetically prepared ones. Hydroxyl groups can be reacted with one or more of acryloyl chloride, methacryloyl chloride, acryl anhydride, or methacryl anhydride and a base catalyst in an aprotic solvent. The second method is an esterification reaction of the hydroxyl groups using acrylic acid or methacrylic acid and is catalyzed using either acidic or basic conditions. The third method involved the transesterification of the hydroxyl groups using methyl acrylate or methyl methacrylate and either an acid or base catalyst.

Triglycerides that contain both hydroxyl and epoxide functionality can be simply prepared as described elsewhere, and could be prepared from naturally hydroxylated oils, such as castor oil, naturally epoxidized oils, such as vernonia oil, or more common plant oils, such as soy bean oil and linseed oil. The hydroxyl groups on such triglycerides can be reacted with acrylic acid, (meth)acrylic acid, or fatty acids through an esterification reaction or with an acid chloride. The epoxide groups could be reacted with acrylic acid, (meth)acrylic acid, or fatty acids as described in the previous paragraphs.

The grafting of fatty acid groups onto the triglycerides serves two important functions which are used to tailor the triglyceride for toughening of various vinyl ester and unsaturated polyester resin systems which may possess varying solubilities and compatibilities relative to the toughener. First, the fatty acid groups increase the molecular weight of the triglycerides. Second, the fatty acids reduce the polarity of the triglycerides. Both the molecular weight and the polarity of the triglycerides may be important since these properties determine whether the triglycerides phase separate from the unsaturated polyester resins or the vinyl ester resins used to make the composites of the present invention. In the present invention, phase separation of the triglycerides from the base polymer is desirable since this provides enhanced toughening of the base polymer. Also, controlling the polarity and molecular weight of the triglycerides provides control of when the triglycerides will phase separate from a solution with the unsaturated polyester resins or vinyl resins, thereby providing additional control of the process for making the composites of the invention. In this manner, a spectrum of tougheners having varying molecular weights, sizes, and relative activities have been formulated so that an appropriate toughener can be selected from this spectrum for use in a particular resin system.

A variety of different fatty acids may be grafted onto the triglycerides. Fatty acids having 4-28 carbon atoms, more preferably, 6-24 carbon atoms and most preferably 8-14 carbon atoms, can be grafted onto the triglycerides. Exemplary fatty acids include, but are not limited to, octanoic acid, decanoic acid, dodecanoic acid and tetradecanoic acid.

The synthesis route to prepare the grafted triglycerides includes two stages. In stage 1, a carboxylic acid group of methacrylic acid reacts with an epoxy group of epoxidized triglyceride in order to acrylate the triglyceride. A mixture of the methacrylic acid and the epoxidized triglyceride may be placed in oven at 70° C. for 1 hour and subsequently, heated at 90° C. for another 3 hours. Acid number titration may be used to determine when the reaction is complete.

Figure 5:
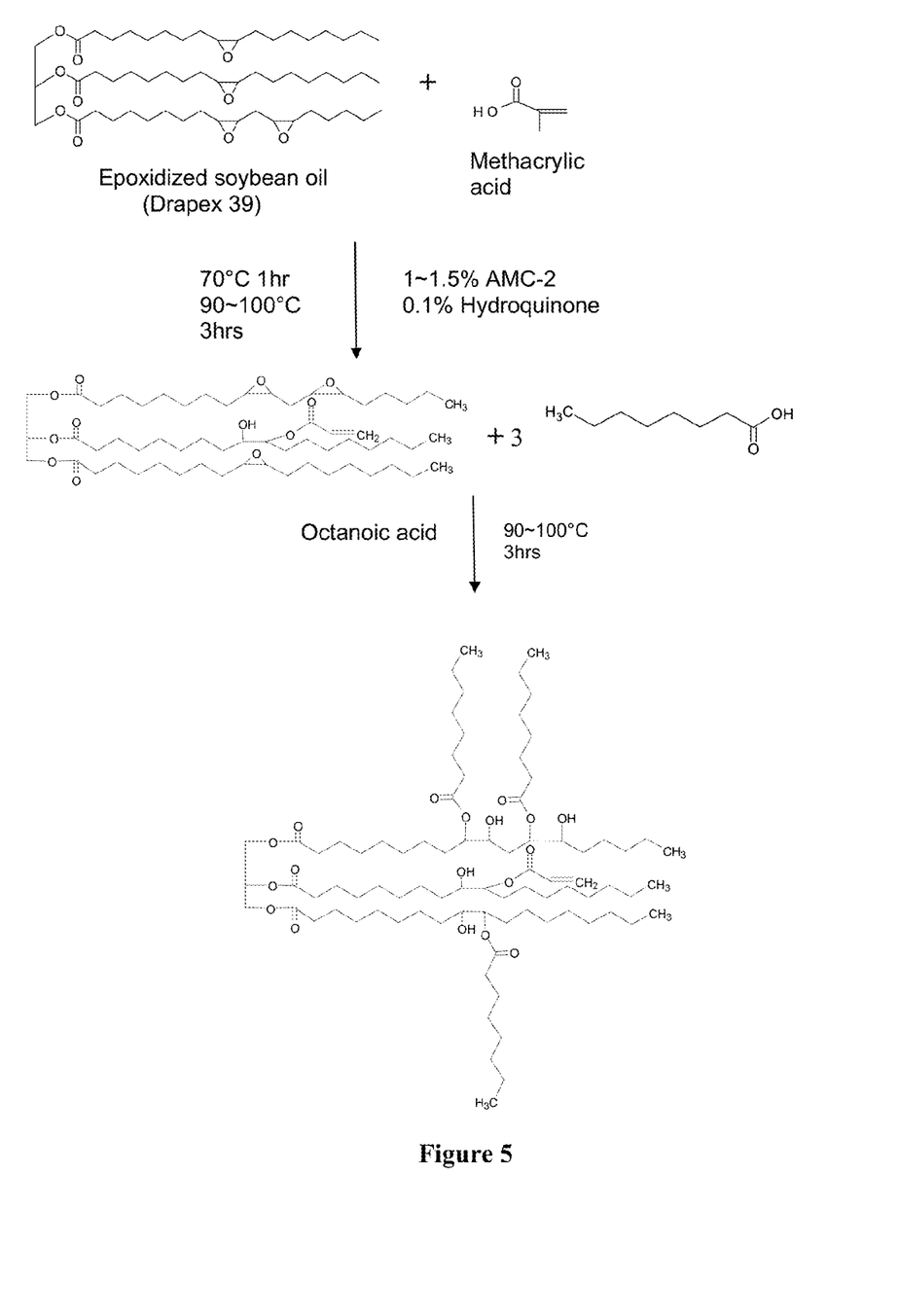
FIG. 5 shows the reaction scheme for the synthesis of the grafted triglyceride of Examples 30-33.
Figure 6:
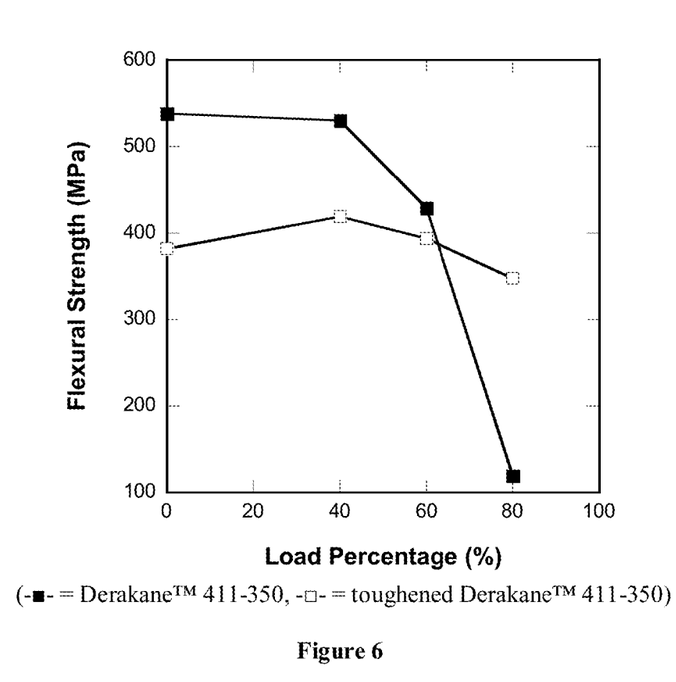
FIG. 6 shows the residual flexural strength of pure and toughened resins of Example 39 and Comparative Example J after 10000 cycles.
Figure 7:
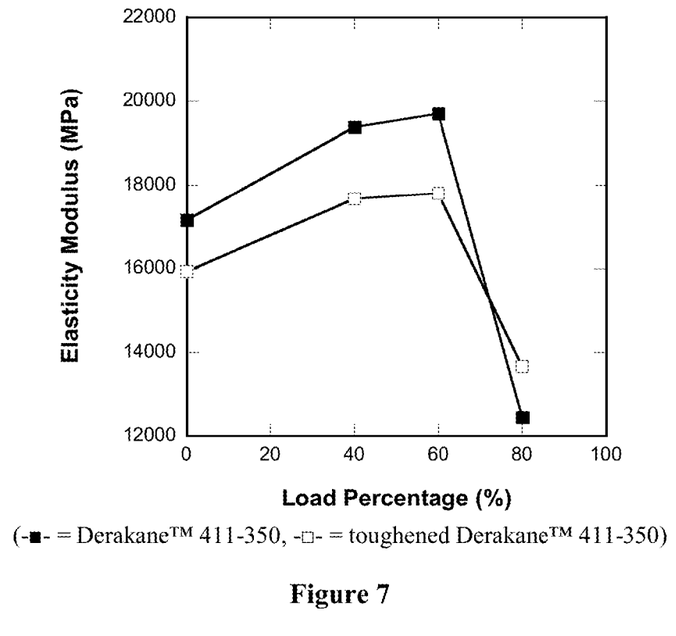
FIG. 7 shows the residual elasticity modulus of pure and toughened resins of Example 39 and Comparative Example J after 10000 cycles.
Figure 8:
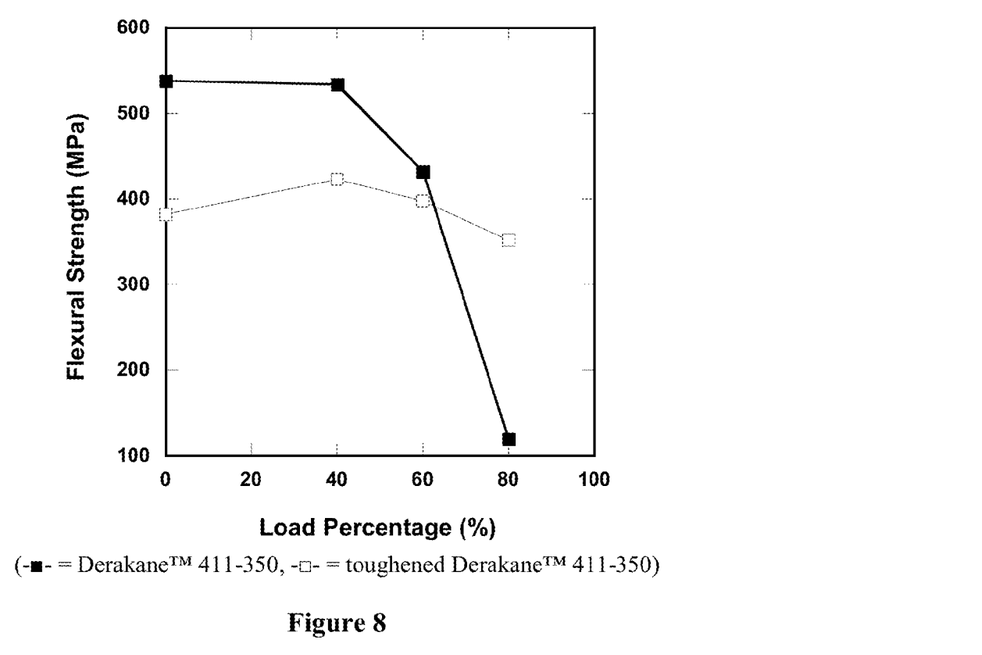
FIG. 8 shows a plot of fatigue life vs. strength under flexural loading conditions of pure and toughened resins of Example 39 and Comparative Example J after 10000 cycles.
Figure 9:
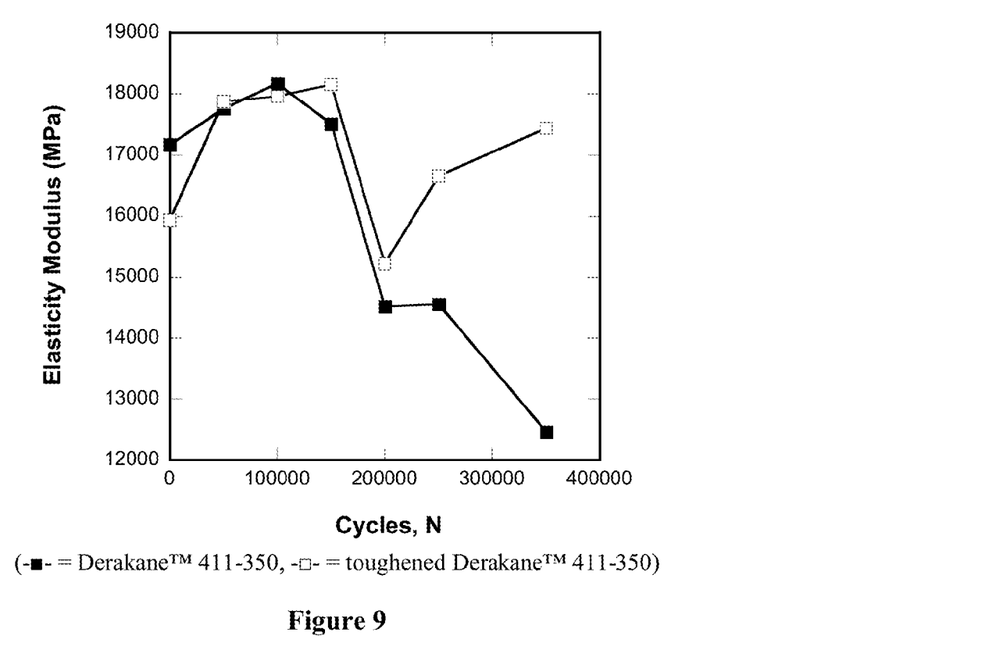
FIG. 9 shows a plot of fatigue life vs. elasticity modulus under flexural loading conditions of pure and toughened resins of Example 39 and Comparative Example J after 10000 cycles.

In stage 2, a fatty acid may be added to the product of stage 1, mixed well, and heated in oven at 90° C. for 6 hours until the completion of the reaction as indicated by acid number titration. An exemplary synthesis of a grafted triglyceride in accordance with the present invention is shown in FIG. 5.

In stage 1 of the synthesis, epoxidized triglyceride is acrylated. The amount of acrylating reagent, typically methacrylic acid, employed may be a sufficient amount to react with from about 10% to about 60% of the epoxy groups on the epoxidized triglyceride. More preferably, the amount of acrylating reagent is selected to react with from about 24 to about 48% of the epoxy groups on the epoxidized triglyceride. Sufficient vinyl groups should be introduced to the acrylated triglyceride to ensure good curing of the material during the step of curing the grafted triglyceride with an unsaturated polyester or vinyl ester resin.

In one embodiment, stage 1 of the reaction is carried out to completion, e.g. to substantial depletion of the acrylating reagent prior to introduction of fatty acid for stage 2 of the reaction. In another embodiment, the acrylating reagent and the fatty acid may be introduced to the epoxidized triglyceride together and the reaction carried out simultaneously. In a more preferred embodiment, a portion of the fatty acid is mixed with the acrylating reagent and reacted with the epoxidized triglyceride and, upon substantial completion of this reaction, the remainder of the fatty acid is introduced and stage 2 of the reaction is completed. The reagents may be added batchwise or continuously over time in order to exert control over the reaction.

The amount of fatty acid employed in the reaction is preferably from about 0.1 to about 5 moles of fatty acid per mole of acrylating reagent, more preferably, from about 1 to about 3.5 moles of fatty acid per mole of acrylating reagent and, most preferably, from about 2 to about 3 moles of fatty acid per mole of acrylating agent.

In one embodiment, the combined amounts of acrylating agent and fatty acid added to the reaction mixture are sufficient to react with substantially all of the epoxy groups of the epoxidized triglyceride. In another embodiment, less of one or both of the acrylating reagent and the fatty acid are employed to ensure that at least some residual epoxy groups remain on the grafted triglyceride.

The type and amount of fatty acid can be adjusted to tune the molecular weight of the grafted triglyceride for particular resin systems. Suitable molecular weights of the grafted triglycerides may vary over a wide range, depending primarily on the type of resin to be cured. In one aspect, the molecular weight of the grafted triglyceride is tuned to substantially match the molecular weight of the resin in order to form a miscible system for curing, e.g. the molecular weight of the grafted triglyceride is within about 2000 g/mole of the molecular weight of the resin to be cured, more preferably, within about 1000 g/mole and most preferably, within about 500 g/mole of the molecular weight of the resin to be cured. Suitable molecular weights for the grafted triglycerides are typically within the range of about 900-3000 g/mole, more preferably, about 1200-2000 g/mole and most preferably from about 1300-1600 g/mole.

The reaction to produce the grafted triglyceride is preferably carried out until the acid number of the resulting product is about 10 or less. It has been found that in some cases, residual acid in the grafted triglyceride may have an adverse effect on the cured resin system and thus in such case it is desirable to ensure that the grafted triglyceride has a low residual acid content. One method for accomplishing this is demonstrated in Example 34 below where 20% less of the combination of acrylating agent and fatty acid were employed than the stoichiometric amount required to react with all of the epoxy groups on the epoxidized triglyceride. Other suitable conventional methods known to a skilled person may also be used to ensure a low residual acid content in the grafted triglyceride including, for example, purification, neutralization, etc.

The grafted triglyceride may be used to cure unsaturated polyester resins and vinyl ester resins. The curing step may be carried out by mixing the grafted triglyceride with the resin, a suitable curing system and optionally, a reactive diluent. Suitable curing systems for unsaturated polyester and vinyl ester resins are well known to skilled persons and thus are not discussed in detail here. Exemplary curing systems are shown in the Examples given below. Suitable reactive diluents for unsaturated polyester and vinyl ester resins are also well known to skilled persons. A typical reactive diluent used for vinyl ester resins is styrene. Other reactive diluents used include but are not limited to (methyl)methacrylate and methacrylated fatty acids.

The amount of reactive diluent used in a particular resin may vary widely depending on the nature and properties of the particular resin. Thus, the amount of reactive diluent can make up from about 0-70 wt % of the combination of grafted triglyceride, resin and reactive diluent, more preferably from about 20-50 wt % or most preferably from about 30-45 wt %.

The grafted triglyceride preferably makes up from about 2-30 wt % of the combination of the grafted triglyceride, resin, and optional reactive diluent, more preferably, from about 5-20 wt % and, most preferably, from about 10-15 wt %. The amount of grafted triglyceride may vary depending on a number of factors such as the type of resin, the type and amount of reactive diluent, the type of grafted triglyceride, and the desired properties of the cured resin system. Factors such as the polarities and molecular weights of the grafted triglyceride and resin may also play a role in the selection of the amount of grafted triglyceride to be employed. Generally, an amount of grafted triglyceride is employed which exhibits a good miscibility with the resin and optional reactive diluent when mixed, but that also sufficiently phase separates from the resin during curing to provide the desired toughening effect.

In another aspect, the present invention relates to cured resin systems made using the grafted triglycerides of the present invention. These cured resin systems are made from unsaturated polyester and vinyl ester resins cured in the presence of the grafted triglycerides of the present invention and optionally containing a reactive diluent. The amounts of the various components are given above in the discussion of the method for making such cured resin systems.

It has been found that the fracture toughness of unsaturated polyester and vinyl ester resin systems can be significantly improved by curing these resins in the presence of the grafted triglycerides of the present invention. In addition, other important properties of these resins can be maintained at acceptable levels using these grafted triglycerides while achieving the desired increase in fracture toughness. For example, resin systems with reduced hazardous air pollutant content can be prepared that have only a slight reduction in glass transition temperature and only a slight increase in resin viscosity.

Also, resin systems having improved fracture toughness can be obtained with only a slight reduction in glass transition temperature and only a slight increase in resin viscosity.

More specifically, the grafted triglycerides can be used as an additive to a vinyl ester or unsaturated polyester to toughen these resins while causing only a slight reduction in glass transition temperature and a slight increase in viscosity. Also, the grafted triglycerides can be used as an additive to a vinyl ester or unsaturated polyester to reduce hazardous air pollutant content while toughening the resin, yet only causing only a slight reduction in glass transition temperature and a slight increase in viscosity. As a result, the present invention provides a means for producing unsaturated polyester and vinyl ester resin systems that may be suitable for a variety of applications where fracture toughness is required.

In another aspect, the present invention relates to Acrylated triglycerides grafted with at least one fatty acid residue (grafted triglycerides). Preferably, the fatty acid residue is a residue of any fatty acid as described above and contains from about 4 to 28 carbon atoms. The grafted, acrylated triglycerides contain an average of more than zero fatty acid residues per triglyceride. The grafted, acrylated triglyceride may have a ratio of vinyl groups to grafted fatty acid residues of from about 0.2 to about 5.0. These grafted, acrylated triglycerides preferably contain from about 0.5 to about 3 vinyl groups per mole of triglyceride, more preferably, from about 0.8 to about 2.5 vinyl groups per mole, and most preferably, from about 1 to about 2 vinyl groups per mole of triglyceride.

Suitable molecular weights for the grafted triglycerides are typically within the range of about 900-3000 g/mole, more preferably, about 1200-2000 g/mole and most preferably from about 1300-1600 g/mole. The grafted triglycerides may contain from about 0-1 residual epoxy groups per mole of triglyceride, more preferably, from about 0 to 0.5 residual epoxy groups per mole of triglyceride and most preferably from about 0-0.2 residual epoxy groups per mole of triglyceride.

In another aspect, the present invention relates to composites prepared using the modified unsaturated polyester and vinyl ester resins of the present invention. Such composites are formed from the cured resin system described above and may contain fillers or reinforcing materials such as fibers, clays, silicates, fillers, whiskers or other conventional filler or reinforcing materials. Typical fibers used for such composites applications include but are not limited to E-glass, S-glass, Kevlar, carbon fiber, and ultra-high molecular weight polyethylene.

The curable and cured compositions of the present invention may also include nano-materials dispersed in the compositions. A nano-material is any reinforcing material or mixture thereof, which has at least one dimension in the nanometer scale. Suitable nano-materials include, for example, nanoclays including, but not limited to, layered crystalline clays (such as natural or synthetic silicates like aluminum or aluminum-magnesium silicates), nano-fibers (such as cellulosic nano-fibers), nano-whiskers (such as cellulosic nano-whiskers), nanotubes (such as carbon or metal oxide nanotubes), nano-platelets (such as carbon nano-platelets), metallic oxides, metallic sulfides, metallic layered double hydroxides, or mixtures thereof.

Reinforcing materials may be treated with organophilic modifying compounds to enhance physical and chemical interaction between the reinforcing material and the resin. Organophilic modifying compounds are generally known in the art and include such interacting groups as, for example, amines, carboxylics, alcohols, phenols, silanes, organophilic ions, onium ions (ammonium, phosphonium, sulfonium and the like), etc.

The reinforcing material may be present in the nanocomposite in an amount that is suitable for imparting the desired effect of the reinforcing material without compromising other properties of the composite necessary for the application in which the composite is to be used. For example, the reinforcing material may be used to increase the fracture toughness of the composite, to modify the modulus of the composite and/or to modify the electrical conductivity of the composite. One skilled in the art can readily determine a suitable amount of reinforcing material.

The amount of reinforcing material in the nanocomposite may be from about 0.1 to about 75 weight percent based on the total weight of the composite, or from about 0.2 to about 30 weight percent, or from about 0.5 to about 20 weight percent, or from about 1 to about 10 weight percent.

The amount of reinforcing material in particle filled (non-nano talc, silica, etc.) composites may be from about 0.1 to about 75 weight percent based on the total weight of the composite, or from about 0.2 to about 30 weight percent, or from about 1 to about 10 weight percent.

The amount of reinforcing material in fiber reinforced composites may be from about 5 to about 90 weight percent based on the total weight of the composite, or from about 10 to about 80 weight percent, or from about 30 to about 75 weight percent.

Although not necessarily preferred, the composites of the present invention may also include suitable additives normally used in polymers. Such additives may be employed in conventional amounts and may be added directly to the process during formation of the composite. Illustrative of such additives are colorants, pigments, carbon black, fibers such as glass fibers, carbon fibers and aramid fibers, fillers, impact modifiers, antioxidants, stabilizers, flame retardants, reheating aids, crystallization aids, oxygen scavengers, plasticizers, flexibilizers, nucleating agents, foaming agents, mold release agents, and combinations thereof.

EXAMPLES

Materials and Methods

Figure 2:
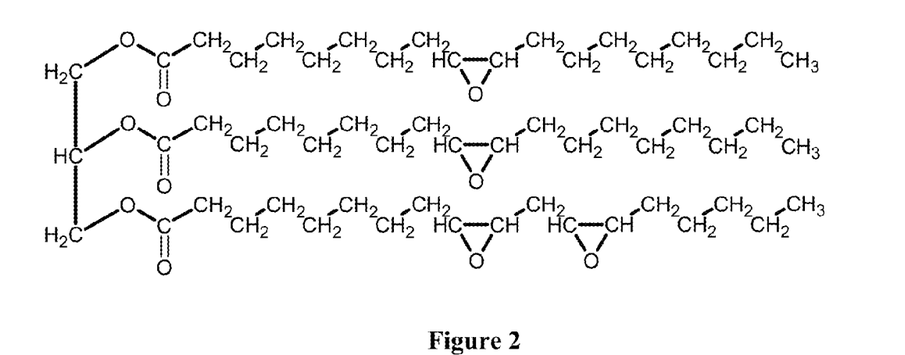
FIG. 2 shows the structure of Drapex™ 39 epoxidized soybean oil, based on $^1$H-NMR analysis and related information.

Commercial epoxidized soybean oil (ESO) from Chemtura Corp., namely Drapex™ 39, was used as a starting material for preparation of the triglycerides. Based on technical information and chemical analysis (NMR, GPC), the molecular weight of Drapex™ 39 is about 1000 g/mol, and the epoxy equivalent weight (EEW) is about 250, indicating the presence of 4 epoxy groups in each ESO molecule. The structure of Drapex™ 39, based on $^1$H-NMR analysis and related information is shown in FIG. 2.

To prepare the acrylated triglyceride (AESO), a mixture of the methacrylic acid and the epoxidized triglyceride was placed in oven at 70° C. for 1 hour and subsequently, heated at 90° C. for another 3 hours. Acid number titration was used to determine when the reaction is complete. The fatty acid was then added to the product of the acrylation reaction, mixed well, and heated in oven at 90° C. for 6 hours until the completion of the reaction as indicated by acid number titration. Acid number titration was performed in accordance with ASTM D1980-87 with an acid number lower than 10 and the disappearance of the epoxy peak in an FTIR spectrum indicating completion of the reaction.

RDX 26936, a commercial VE 828 type vinyl ester resin obtained from Cytec Industries Inc. was used to formulate the base resins. Two base resins were prepared. RDX-1 contained 65 wt % RDX 26936, 25 wt % styrene, and 10 wt % methacrylated octanoic acid (MOct) and RDX-2 contained 65 wt % RDX 26936 and 35 wt % styrene.

Curing of the grafted triglycerides with the base resin was carried out at room temperature for at least 24 hours with the aid of a catalyst package comprised of 1.6 wt. % of Trigonox™ A, from Akzo Nobel and 0.375 wt % cobalt napthenate. Post curing was completed at a temperature of 150-160° C. for about 2 hours to provide cured resin systems.

The Tg's of the cured resin systems were determined on at TA 2980 Dynamic Mechanical Analyzer (DMA) with dual cantilever geometry using machined samples with nominal dimensions of 25 mm×13 mm×3.2 mm. A temperature ramping rate of 2° C./minute from room temperature to 180° C. was applied during the DMA tests. The viscosity of the sample was measured using a Brookfield II viscometer with an 8 mL sample, using a #21 spindle at a temperature of 25° C. and 100 rpm. Once the reading stabilized, it was multiplied by a factor of 40.

The morphologies of the neat Derakene™ 411-350 resins and the grafted triglyceride toughened Derakene™ 411-350 resin systems were evaluated using a scanning electron microscope (SEM), Model XL 30 ESE FEG, with an acceleration voltage of 10 keV.

Static flexural tests were conducted using the procedure of ASTM D790 for three point bending and five tests for each sample were conducted.

Examples 1-12 and Comparative Examples A-B

Starting with Drapex™ 39 commercial epoxidized soybean oil, the formulations shown in Table 1 were employed to synthesize grafted triglycerides in accordance with the present invention using the procedure set forth above. MA represents methacrylic acid in Table 1.

TABLE 1

Formulations used for synthesis of grafted ESO

| Grafted Triglyceride (GT) | ESO amount (g) | Fatty acid (FA) species | Molar ratio of FA to MA | FA weight (g) | MA weight (g) |
|---|---|---|---|---|---|
| 1 | 8 | Octanoic | 1:1 | 2.33 | 1.39 |
| 2 | 8 | Octanoic | 2:1 | 3.10 | 0.93 |
| 3 | 8 | Octanoic | 3:1 | 3.49 | 0.69 |
| 4 | 8 | Decanoic | 1:1 | 2.78 | 1.39 |
| 5 | 8 | Decanoic | 2:1 | 3.70 | 0.93 |
| 6 | 8 | Decanoic | 3:1 | 4.17 | 0.69 |
| 7 | 8 | Dodecanoic | 1:1 | 3.23 | 1.39 |
| 8 | 8 | Dodecanoic | 2:1 | 4.31 | 0.93 |
| 9 | 8 | Dodecanoic | 3:1 | 4.85 | 0.69 |
| 10 | 8 | Tetradecanoic | 1:1 | 3.68 | 1.39 |
| 11 | 8 | Tetradecanoic | 2:1 | 4.91 | 0.93 |
| 12 | 8 | Tetradecanoic | 3:1 | 5.53 | 0.69 |

Cured resin systems were prepared using the procedure set forth above by curing 10 wt % of the grafted triglycerides of Table 1 with RDX-1 and RDX-2 base resins. The glass transition temperatures (Tg) and fracture toughness ($G_{Ic}$) of these cured resin systems are shown in Table 2 (RDX-1 base resin) and Table 3 (RDX-2 base resin). Comparative Examples A-B show the Tg and $G_{Ic}$ of the RDX-1 and RDX-2 base resins without toughener, respectively. Note RDX-1 samples shown in Table 2 (Examples 1-12) only contained 22.5 wt % styrene and the RDX-2 resins in Table 3 (Examples 1A-12A) contained 31.5 wt % styrene.

TABLE 2

$T_g$ and $G_{Ic}$ values for RDX-1 cured resin systems

| Example | Grafted Triglyceride | $T_g$ (° C.) | $T_g$ reduction (° C.) | $G_{Ic}$ (J/m²) |
|---|---|---|---|---|
| A (comparative) | None | 140 | 0 | <100 |
| 1 | 1 | 116 | 24 | — |
| 2 | 2 | 120 | 20 | — |
| 3 | 3 | 123 | 17 | — |
| 4 | 4 | 120 | 20 | — |
| 5 | 5 | 123 | 17 | — |
| 6 | 6 | 123 | 17 | — |
| 7 | 7 | 116 | 24 | — |
| 8 | 8 | 120 | 20 | — |
| 9 | 9 | 126 | 14 | — |
| 10 | 10 | 128 | 12 | — |
| 11 | 11 | 134 | 6 | 388 |
| 12 | 12 | 126 | 14 | — |

TABLE 3

$T_g$ and $G_{Ic}$ values for RDX-2 cured resin systems.

| Example | Grafted Triglyceride | $T_g$ (° C.) | Tg reduction (° C.) | $G_{Ic}$ (J/m²) |
|---|---|---|---|---|
| B (comparative) | None | 156 | 0 | <100 |
| 1A | 1 | 140 | 16 | — |
| 2A | 2 | 141 | 15 | — |
| 3A | 3 | 142 | 14 | — |
| 4A | 4 | 139 | 17 | — |
| 5A | 5 | 144 | 12 | — |
| 6A | 6 | 145 | 11 | — |
| 7A | 7 | 141 | 15 | — |
| 8A | 8 | 144 | 12 | — |
| 9A | 9 | 146 | 10 | — |
| 10A | 10 | 149 | 7 | — |
| 11A | 11 | 147 | 9 | 388 |
| 12A | 12 | 145 | 11 | — |

Figure 3:
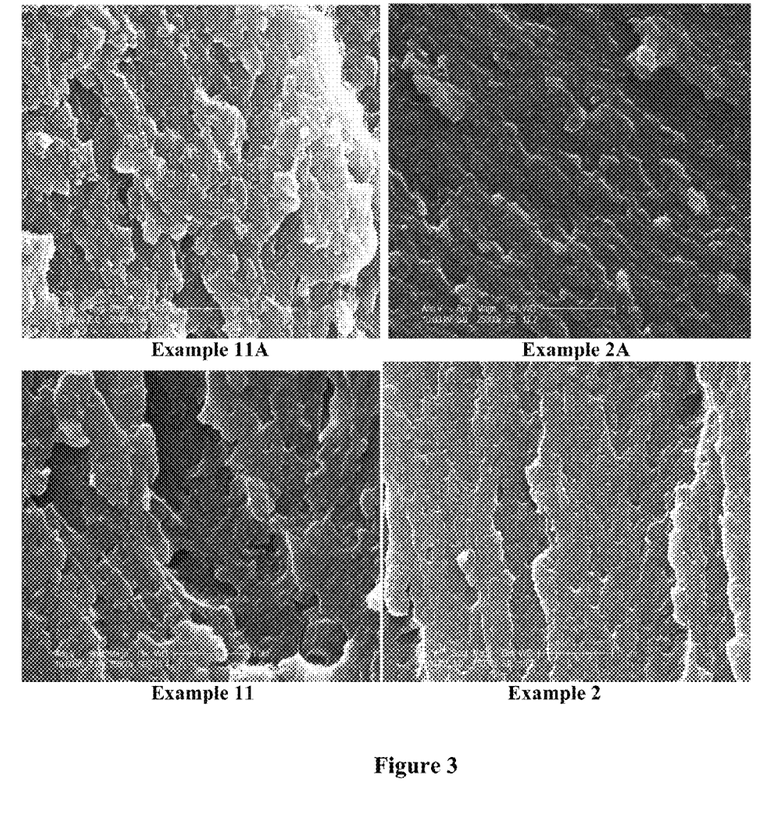
FIG. 3 shows SEM images of the fracture surfaces of selected RDX-1 and RDX-2 toughened resin systems, at a magnification of 25,000×.
Figure 4:
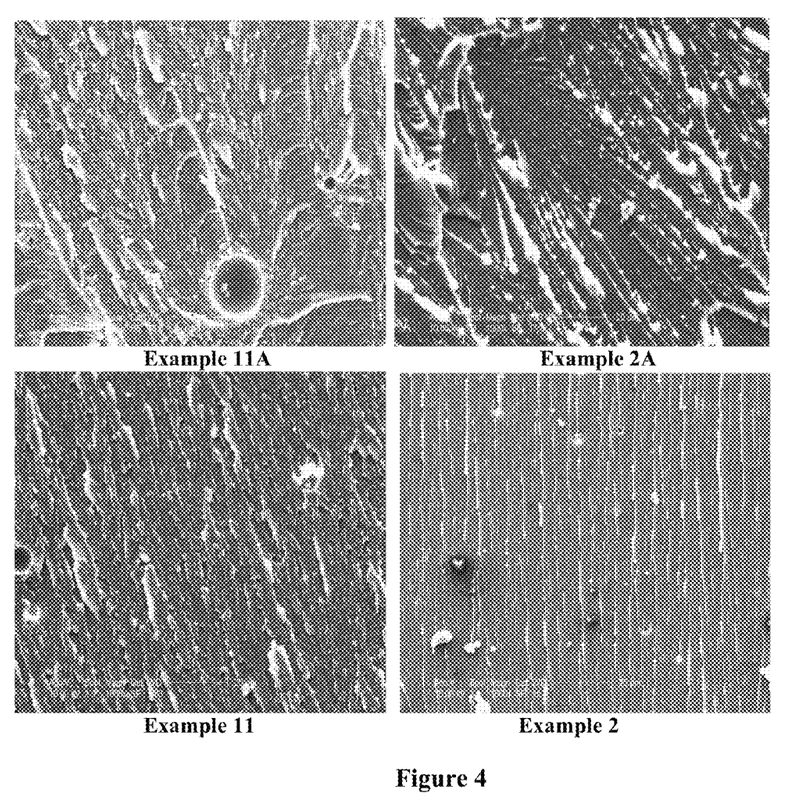
FIG. 4 shows SEM images of the fracture surfaces of selected RDX-1 and RDX-2 toughened resin systems, at a magnification of 1,000×.

FIGS. 3-4 show SEM images of the fracture surfaces of selected RDX-1 and RDX-2 toughened resin systems, at magnifications of 25,000× and 1,000×, respectively. Crack deflections indicative of improved fracture toughnesses can be seen in FIG. 3.

Examples 13-16 and Comparative Example C

Examples 13-16 illustrate tailoring the grafted triglyceride to a particular vinyl ester resin. Derakane™ 411-350 vinyl ester resin, having a styrene content of 45 wt % was cured with various grafted triglycerides at different triglyceride loadings using the curing procedure set forth above. Glass transition temperature, fracture toughness, viscosity at 25° C., miscibility and gel time were assessed for the cured resin systems. Comparative Example C is cured Derakane™ 411-350 vinyl ester resin without toughener. The results are given in Table 4 below.

TABLE 4

Properties of Derakane ™ 411-350 vinyl ester resin systems

| Ex No | Amount of Grafted Triglyceride (GT) | GT | $T_g$ (° C.) | $G_{Ic}$ (J/m²) | Viscosity @25° C. (cP) | Miscibility | Gel Time (min) | Styrene Content (wt %) |
|---|---|---|---|---|---|---|---|---|
| C | 0 | — | 121 | 308 | 520 | n/a | — | 45 |
| 13 | 5% | 12 | 109 | 470 | 800 | Foggy | — | 42.75 |
| 14 | 10% | 6 | 102 | 640 | 644 | clear | 12~14 | 40.5 |
| 15 | 15% | 3 | 115 | 1851 | 700 | clear | 13.5 (100 g) | 38.25 |
| 16 | 20% | 2 | 107 | 1146 | 776 | clear | 10 (100 g) | 36 |

It can be seen from Table 4, with varying species and loading amounts of grafted triglycerides that the maximum toughening effect reflected by both the $G_{Ic}$ and $T_g$ values was obtained for grafted triglyceride 3 at a concentration of 15 wt % in Derakane™ 411-350 vinyl ester resin in addition to a significant reduction in styrene/HAP content.

Examples 17-21 and Comparative Examples D-G

In Examples 17-21, a grafted triglyceride was synthesized by charging a 500 ml four-necked, round-bottomed flask equipped with a mechanical stirrer, condenser, thermometer with a mixture of 200 g ESO, 34.75 g methacrylic acid, 1% by weight of AMC-2 catalyst (Aerojet Chemicals, Rancho Cordova, Calif.), which is a mixture of 50% trivalent organic chromium complexes and 50% phthalate esters and 0.1% by weight of hydroquinone inhibitor. The reaction mixture was heated to 70° C. with continuous stirring. The reaction proceeded at 70° C. for 1 hour and 90° C. for another 3 hours. The second stage was completed by adding 58.25 g of octanoic acid to the formed product with continued heating and stirring at 90° C. for another 4 hours. Acid number titration was employed during the course of the reaction to measure the amount of free (unreacted) acid in the grafted triglyceride. The acid numbers for the two stages were approximately 3 and 24, respectively. The reaction scheme for this synthesis is shown in FIG. 5.

Varying amounts of grafted triglyceride as prepared above, grafted with octanoic acid in a 3:1 weight ratio of fatty acid to methacrylate, were employed to toughen Derakane™ 411-350 using the procedure set forth above. The results are shown in Table 5. A commercially available toughened vinyl ester resin, Derakane™ 8084 is shown as comparative example D.

TABLE 5

Performance of toughened Derakane ™ 411-350 compared to the neat system and a commercial toughened VE resin (Derakane ™ 8084).

| Example | VE Resin system | $T_g$ (° C.) | $G_{Ic}$ (J/m²) | Viscosity @ 25° C. (cP) | Styrene content (%) |
|---|---|---|---|---|---|
| D comparative | Derakane ™ 8084 | 118 | 680 ± 160 | 600 | 40 |
| C comparative | Derakane ™ 411-350 | 123 | 255 ± 55 | 356 | 45 |
| 17 | 5 wt % GT 3 and Derakane ™ 411-350 | 113 | 351 ± 96 | 368 | 42.75 |
| 18 | 10 wt % GT 3 and Derakane ™ 411-350 | 110 | 1217 ± 159 | 424 | 40.5 |
| 19 | 15 wt % GT 3 and Derakane ™ 411-350 | 115 | 1624 ± 243 | 436 | 38.25 |

TABLE 5-continued

Performance of toughened Derakane ™ 411-350 compared to the neat system and a commercial toughened VE resin (Derakane ™ 8084).

| Example | VE Resin system | Tg (° C.) | $G_{I_c}$ (J/m$^2$) | Viscosity @ 25° C. (cP) | Styrene content (%) |
|---|---|---|---|---|---|
| 20 | 20 wt % GT 3 and Derakane ™ 411-350 | 113 | 2034 ± 214 | 476 | 36 |
| E comparative | 10 wt % ESO and Derakane ™ 411-350 | 94 | 426 ± 75 | N/A | 40.5 |
| F comparative | 10 wt % AESO and Derakane ™ 411-350 | 115 | 161 ± 62 | 904 | 40.5 |
| G comparative | 10 wt % of a mixture of ESO, MA and FA and Derakane ™ 411-350 | 90 | 329 ± 48 | 590 | 40.5 |

It was found the addition of grafted triglyceride significantly improved the fracture toughness of VE resin, and that fracture toughness is generally proportional to grafted triglyceride loading above 5 wt %. Additionally, grafted triglyceride toughened VE resins have low viscosities and can be formulated with reduced styrene contents.

To demonstrate that the toughening effect is not due to the raw materials used to make the grafted triglycerides, comparative examples E-G were performed in an attempt to toughen Derakane™ 411-350 with the various raw materials used to make the grafted triglycerides. In comparative example E, Drapex™ 39 epoxidized soybean oil (ESO) was employed. In comparative example F, acrylated Drapex™ 39 epoxidized soybean oil (AESO) was employed. In comparative example G, 10 wt % of a proportioned unreacted mixture of ESO, fatty acid (FA) and methacrylic acid (MA) proportioned based on the amounts used to make GT 3, was employed.

The following mechanical properties, Young's Modulus, flexural strength and flexural modulus, of the vinyl ester resin systems of examples 17-20 and comparative example C were determined and the results are given in Table 6 below.

TABLE 6

Mechanical properties of the toughened vinyl ester resin systems.

| Example | Young's Modulus (GPa) | Flexural Strength (MPa) | Flexural Modulus (GPa) |
|---|---|---|---|
| C (comparative) | 3.19 ± 0.1 | 101 ± 10.8 | 2.78 ± 0.1 |
| 17 | 3.22 ± 0.04 | 119 ± 14 | 2.90 ± 0.06 |
| 18 | 2.69 ± 0.13 | 105 ± 7.6 | 2.4 ± 0.3 |
| 19 | 2.32 ± 0.05 | 59 ± 12 | 1.89 ± 0.1 |
| 20 | 2.08 ± 0.05 | 64 ± 4.9 | 1.67 ± 0.03 |

Young's modulus was found to decrease with increasing grafted triglyceride loadings above 5 wt %. Values of flexural modulus follow a similar trend, as do the storage modulus values (not shown in the table). Flexural strength was found to increase for grafted triglyceride loadings up to 10 wt % and then to decrease above 10 wt % loading. Given, viscosity, fracture toughness, modulus, and flexural strength results, it appears that for Derakane™ 411-350, a grafted triglyceride loading of around 10 wt % provides a good balance of properties. Even so, as shown by the properties of the vinyl ester resin systems in Table 6, extremely high toughness can be exploited by using higher grafted triglyceride loadings without serious adverse consequences to the vinyl ester resin system performance and processing characteristics.

Example 21

Because the synthesis of the grafted triglyceride of Examples 17-20 ended with an acid number of 24 (higher than desired), the grafted triglyceride of Examples 17-20 was synthesized using 80% of the methacrylic acid and 80% of the octanoic acid that were used in Examples 17-20. The acid number at the completion of this synthesis was 4, indicating a level of acid remaining in the grafted triglyceride within the desired range. Derakane™ 411-350 was cured with 10 wt % of the grafted triglyceride prepared in this example and the fracture toughness of the cured vinyl resin system was found to be 1338±321 J/m2, which is comparable to the fracture toughness of the cured vinyl resin system having a 10% loading of grafted triglyceride of Example 18.

Example 22 and Comparative Example H

The grafted triglyceride of Example 21 was used at a 10 wt % loading to cure a multi-functional novolac vinyl ester resin, namely, Hetron™ 980. A catalyst package of 1.5% Trigonox™ 239A and 0.375% cobalt (6%) naphthenate was used for curing. The properties of the cured toughened vinyl ester resin system are given in Tables 7-8 along with the properties of cured Hetron™ 980 without toughener (comparative example H).

TABLE 7

Toughening of Hetron ™ 980

| Example | Resin | Loading of Grafted Triglyceride (wt %) | Tg | $G_{I_c}$ (J/m$^2$) | Viscosity @25° C. (cP) | Styrene content (wt %) |
|---|---|---|---|---|---|---|
| H (comparative) | Hetron ™ 980 | 0 | 152 | 69 ± 46 | 540 | 35 |
| 22 | | 10 | 149 | 577 ± 101 | 656 | 31.5 |

TABLE 8

Flexural properties of modified Hetron ™ 980

| Example | Flexural Strength (MPa) | Modulus of Elasticity in Bending (MPa) |
|---|---|---|
| H (comparative) | 113 | 3096 |
| 22 | 81 | 2228 |

Examples 23-24 and Comparative Example I

A lower molecular weight mixture of the methacrylate ester of a diglycidyl ether of bisphenol A and styrene, Derakane™ 441-400, having a molecular weight of 690 g/mole and a styrene content of 33 wt %, was toughened with two different grafted triglycerides in accordance with the present invention at different loading levels. The properties of the cured toughened vinyl ester resin system are given in Table 9 along with the properties of cured Derakane™ 441-400 without toughener (comparative example I).

TABLE 9

Toughened of Derakane ™ 441-400

| Example | Toughener | Amount of Toughener (wt %) | Tg (° C.) | $G_{1c}$ (J/m²) | Viscosity @25° C. (cP) | Styrene Content (wt %) |
|---|---|---|---|---|---|---|
| I (comparative) | None | 0 | 141 | 171 ± 42 | 532 | 33 |
| 23 | GT 12 of Table 1 | 15 | 139 | 660 ± 125 | 648 | 28.05 |
| 24 | GT 11 of Table 1 | 20 | — | 544 ± 103 | 692 | 26.4 |

Example 25 and Comparative Example J

A dicyclopentadiene type unsaturated polyester, IPPE1™ from Interplastic Corp. containing 22 wt % styrene was toughened with 15 wt % of the grafted triglyceride as prepared in Example 21. Curing was carried out in the presence of 1.5 wt % MEKP-9H and 0.4% cobalt naphthenate at room temperature for at least 24 hours followed by post-cure at 100° C. for 2 hours. The results are given in Table 10, with cured IPPE1™ without toughener shown as comparative example J.

TABLE 10

Properties of toughened unsaturated polyester resin

| Example | Loading amount (wt %) | $G_{1c}$ (J/m²) | $T_g$ (° C.) | Styrene Content (wt) |
|---|---|---|---|---|
| J (comparative) | 0 | 41 | 91 | 22 |
| 25 | 15% | 200 | 77 | 18.7 |

Example 26 and Comparative Example K

Displacement control was employed to test the fatigue performance of two polymer resin based composites, Derakane™ 411-350 and bio-rubber toughened Derakane™ 411-350 prepared in accordance with Example 21. The results are given in FIGS. 6-9.

The foregoing examples have been presented for the purpose of illustration and description only and are not to be construed as limiting the scope of protection. The scope of the invention is to be determined from the claims appended hereto.

What is claimed is:

1. A cured resin comprising a cured product obtained by curing a material selected from the group consisting of vinyl esters and unsaturated polyesters and mixtures thereof and a grafted triglyceride comprising an acrylated triglyceride grafted with an average of more than zero fatty acid residues per triglyceride, wherein the grafted triglyceride has a molecular weight of at least about 900 g/mole, the fatty acid residue contains from 4 to 28 carbon atoms and the ratio of vinyl groups to grafted fatty acid residues is from about 0.2 to about 5.0.

2. A cured resin as claimed in claim 1, wherein the material further comprises up to about 70% by weight of a reactive diluent.

3. A cured resin as claimed in claim 1, wherein the material further comprises from about 20% to about 55% by weight of a reactive diluent.

4. A cured resin as claimed in claim 2, wherein the reactive diluent is styrene.

5. A composite comprising the cured resin of claim 1 and from about 0.1 to about 75 weight percent, based on the total weight of the composite, of a filler or reinforcing material.

6. The cured resin system of claim 1, wherein the triglyceride is obtained from a material selected from the group consisting of plant oils, animal oils, and algae oils.

7. The cured resin system of claim 1, wherein the grafted fatty acid residue has 6 to 24 carbon atoms.

8. The cured resin system of claim 1, wherein the grafted fatty acid residue has 8 to 18 carbon atoms.

9. The cured resin system of claim 1, comprising one or more epoxy groups on the grafted triglyceride.

10. The cured resin system of claim 1, wherein the grafted triglyceride has a molecular weight which is within 500 g/mole of the molecular weight of at least one said unsaturated polyester or vinyl ester.

11. The cured resin system of claim 1, wherein the mixture further comprises from about 30 to about 45% by weight of a reactive diluent.

12. The cured resin system of claim 2, wherein the material comprises a vinyl ester resin.

13. The cured resin system of claim 2, wherein the material comprises an unsaturated polyester.

14. The cured resin system of claim 2, wherein the grafted triglyceride is reacted with a material selected from ortho-resins based on phthalic anhydride, maleic anhydride, fumaric acid, glycols or hydrogenated bisphenol-A.

15. The cured resin system of claim 2, wherein the grafted triglyceride is reacted with a material selected from ortho-resins based on a glycol selected from the group consisting of 1,2-propylene glycol, ethylene glycol, diethylene glycol, triethylene glycol, 1,3-propylene glycol, dipropylene glycol, tripropylene glycol and neopentyl glycol.

16. The cured resin system of claim 2, wherein the grafted triglyceride is reacted with a material selected from Iso-resins prepared from isophthalic acid, maleic anhydride, fumaric acid or a glycol.

17. The cured resin system of claim 2, wherein the grafted triglyceride is reacted with a material selected from bisphenol-A fumarates.

18. The cured resin system of claim 2, wherein the grafted triglyceride is reacted with a material selected from chlorendics prepared from chlorine/bromine containing anhydrides or phenols.

19. The cured resin system of claim 2, wherein the grafted triglyceride is reacted with a material selected from vinyl ester resins produced by reaction of epoxy resins with (meth) acrylic acid or (meth)acrylamide.

20. A composite comprising the cured resin of claim 4 and from about 0.1 to about 75 weight percent, based on the total weight of the composite, of a filler or reinforcing material.

* * * * *